United States Patent
Furukawa et al.

(10) Patent No.: US 10,550,916 B2
(45) Date of Patent: Feb. 4, 2020

(54) CHAIN TENSIONER, CHAIN TENSIONER GROUP, AND METHOD OF MANUFACTURING A CHAIN TENSIONER

(71) Applicant: NTN CORPORATION, Osaka (JP)

(72) Inventors: Tasuku Furukawa, Shizuoka (JP); Seiji Sato, Shizuoka (JP)

(73) Assignee: NTN CORPORATION, Osaka (JP)

( * ) Notice: Subject to any disclaimer, the term of this patent is extended or adjusted under 35 U.S.C. 154(b) by 266 days.

(21) Appl. No.: 15/514,960

(22) PCT Filed: Sep. 28, 2015

(86) PCT No.: PCT/JP2015/077260
§ 371 (c)(1),
(2) Date: Mar. 28, 2017

(87) PCT Pub. No.: WO2016/056415
PCT Pub. Date: Apr. 14, 2016

(65) Prior Publication Data
US 2017/0211663 A1    Jul. 27, 2017

(30) Foreign Application Priority Data
Oct. 6, 2014  (JP) .................................. 2014-205519

(51) Int. Cl.
*F16H 7/08* (2006.01)
*F02B 67/06* (2006.01)

(52) U.S. Cl.
CPC ............... *F16H 7/08* (2013.01); *F02B 67/06* (2013.01); *F16H 7/0848* (2013.01); *F16H 2007/0806* (2013.01); *F16H 2007/0857* (2013.01)

(58) Field of Classification Search
CPC ........ F16H 7/08; F16H 7/0836; F16H 7/0848; F16H 7/1236; F16H 2007/0806;
(Continued)

(56) References Cited

U.S. PATENT DOCUMENTS 5,167,402 A * 12/1992 Nakakubo ............... B25B 33/00
                                                           188/316
5,259,820 A * 11/1993 Mott ...................... F16H 7/0848
                                                           474/110
(Continued)

FOREIGN PATENT DOCUMENTS

DE    196 52 852    6/1997
JP    8-247237      9/1996
(Continued)

OTHER PUBLICATIONS

Extended European Search Report dated Aug. 25, 2017 in European Application No. 15849774.3.
(Continued)

*Primary Examiner* — Michael R Mansen
*Assistant Examiner* — Robert T Reese
(74) *Attorney, Agent, or Firm* — Wenderoth, Lind & Ponack, L.L.P.

(57) ABSTRACT

A chain tensioner includes an oil supply passage for supplying hydraulic oil into a pressure chamber defined by a cylinder and a plunger, and a check valve provided at the end of the oil supply passage. A leak gap is defined between the sliding surfaces of the cylinder and the plunger. The plunger is biased by a return spring in the direction in which the plunger protrudes out of the cylinder. A plug is press-fitted in a cylindrical inner periphery of a through hole formed in the plunger to extend from a protruding end surface of the plunger to the pressure chamber to define an air vent passage. It is possible to change the hydraulic damper force simply by replacing the plug with another different type of plug to define a different air vent passage.

14 Claims, 4 Drawing Sheets

(58) Field of Classification Search
CPC ..... F16H 2007/0817; F16H 2007/0855; F16H 2007/0857; F16H 2007/0859; F16H 2007/0891

See application file for complete search history.

(56) References Cited

U.S. PATENT DOCUMENTS

| | | | |
|---|---|---|---|
| 5,601,505 A | 2/1997 | Tada | |
| 5,653,652 A | 8/1997 | Simpson | |
| 6,383,103 B1* | 5/2002 | Fujimoto | F01L 1/02 474/109 |
| 2004/0171447 A1* | 9/2004 | Okabe | F16H 7/0484 474/109 |
| 2010/0130320 A1 | 5/2010 | Kitano et al. | |
| 2014/0057748 A1 | 2/2014 | Satomura et al. | |

FOREIGN PATENT DOCUMENTS

| | | |
|---|---|---|
| JP | 11-182639 | 7/1999 |
| JP | 2006-46610 | 2/2006 |
| JP | 2009-79604 | 4/2009 |
| JP | 2011-149468 | 8/2011 |
| JP | 2012-241794 | 12/2012 |
| JP | 2013-72493 | 4/2013 |
| WO | 2009/041341 | 4/2009 |

OTHER PUBLICATIONS

International Search Report dated Dec. 22, 2015 in corresponding International (PCT) Application No. PCT/JP2015/077260.
International Preliminary Report on Patentability dated Apr. 11, 2017 in corresponding International (PCT) Application No. PCT/JP2015/077260.

* cited by examiner

CHAIN TENSIONER, CHAIN TENSIONER GROUP, AND METHOD OF MANUFACTURING A CHAIN TENSIONER

TECHNICAL FIELD

This invention relates to a chain tensioner used to maintain tension of a timing chain for driving camshafts of an automotive engine, a chain tensioner group comprising a plurality of different kinds of such chain tensioners, and a method of manufacturing such a chain tensioner.

BACKGROUND ART

Typical automotive engines include a timing chain (hereinafter simply referred to as the "chain") through which the rotation of the crankshaft is transmitted to the camshafts to rotate the camshafts, thereby opening and closing the valves of the combustion chambers. In order to keep the tension of the chain within an appropriate range, many of such engines further include a tension adjusting device comprising a chain guide pivotable about a pivot shaft, and a chain tensioner which presses the chain through the chain guide.

One known chain tensioner used in this tension adjusting device includes a tubular cylinder having an open end and a closed end, a tubular plunger having a bottom and an open end, and axially slidably inserted in the cylinder such that the open end is located in the cylinder, a return spring biasing the plunger in the direction in which the plunger protrudes out of the cylinder, an oil supply passage through which hydraulic oil is fed into a pressure chamber defined by the plunger and the cylinder, and a check valve provided at the end of the oil supply passage connected to the pressure chamber, and configured to allow only a flow of hydraulic oil from the oil supply passage toward the pressure chamber (JP Patent Publication 2009-79604A).

This chain tensioner is configured such that when the tension of the chain increases while the engine is running, the plunger is moved in the direction in which the plunger is pushed into the cylinder (this direction is hereinafter referred to as the "push-in direction") under the tension of the chain, thus absorbing the tension of the chain. When the plunger is pushed in, hydraulic oil in the pressure chamber flows through a leak gap between the sliding surfaces of the plunger and the cylinder, thus damping and slowing down the movement of the plunger due to the viscous resistance of hydraulic oil.

When the tension of the chain decreases while the engine is running, the plunger is moved in the direction in which the plunger protrudes out of the cylinder (this direction is hereinafter referred to as the "protruding direction") under the biasing force of the return spring, thereby eliminating slackness of the chain. When the plunger is pushed out, the check valve opens, causing hydraulic oil to flow from the oil supply passage into the pressure chamber, so that the plunger is pushed out quickly.

When the engine is stopped, since the oil pump also stops, the level of the hydraulic oil in the oil supply passage drops, so that a large amount of air remains in the oil supply passage. As a result, when the engine is restarted, a large amount of air tends to flow into the pressure chamber from the oil supply passage, and could get trapped in the plunger. If a large amount of air is trapped in the plunger when a load in the push-in direction is applied to the plunger, since the plunger moves while compressing the air trapped in the plunger, the damper performance of the chain tensioner deteriorates.

In order to prevent deterioration in the damper performance, this chain tensioner includes a mechanism for expelling air in the plunger.

This mechanism includes a cylindrical through hole extending through the plunger for communication between the interior and exterior of the plunger at its protruding end protruding out of the cylinder, a plug press-fitted in the cylindrical inner periphery of the through hole, and formed with a leak groove defined by an external thread on its outer periphery such that air in the plunger is discharged to the exterior of the plunger through the leak groove. By forming such an air vent passage, compared with an arrangement in which air vent passage is formed by press-fitting a cylindrical roller into a hole formed with an internal thread, it is possible to reduce burrs when the plug is press-fitted, and it is also possible to more easily remove burrs.

With the conventional chain tensioner described above, it is possible to change the hydraulic damper force by changing the setting of the leak gap. However, since the size of the leak gap changes with the difference in thermal behavior between the cylinder and the plunger, a change in temperature influences the hydraulic damper force generating characteristics. Namely, there is a large difference between the hydraulic damper force generating characteristics at normal temperature and at high temperature. In order to reduce the influence of a change in temperature, the setting of the leak gap is limited. Also, the hydraulic damper force generating characteristics required differ from one engine type to another because of the difference in engine behavior. Thus, it was basically necessary to design the internal structure of a chain tensioner for one engine type separately from a chain tensioner for another engine type.

An object of the present invention is to provide a chain tensioner configured such that the hydraulic damper force generated can be changed easily, and to provide chain tensioners which generate different hydraulic damper forces in an easy manner.

SUMMARY OF THE INVENTION

In order to achieve the above-mentioned object, the present invention provides a chain tensioner comprising: a tubular cylinder having an open end and a closed end; and a plunger axially slidably inserted in the cylinder, in which the plunger is a tubular member having an open end located in the cylinder and a protruding end surface protruding beyond the cylinder. An oil supply passage is connected at one end of the oil supply passage to a pressure chamber defined by the cylinder and the plunger such that hydraulic oil can be supplied into the pressure chamber via the oil supply passage; and a check valve is provided at the one end of the oil supply passage, and is configured to allow only a flow of hydraulic oil from the oil supply passage toward the pressure chamber. A leak gap is defined between sliding surfaces of the cylinder and the plunger, and is configured such that hydraulic oil in the pressure chamber can flow out of the pressure chamber via the leak gap. A return spring biases the plunger in a direction in which the plunger protrudes out of the cylinder, and the plunger is formed with a through hole extending from the protruding end surface of the plunger to the pressure chamber, and has a cylindrical inner periphery. A plug having a leak groove on an outer periphery of the plug is press-fitted in the cylindrical inner periphery of the through hole to define an air vent passage between the cylindrical inner periphery of the through hole and the outer periphery of the plug. The chain tensioner is configured such that simply by changing the kind (type) of plug press-fitted in the cylindrical inner periphery of the through hole, the chain tensioner generates a different hydraulic damper force.

With this arrangement, since the hydraulic damper force can be changed simply by changing only the plug to be press-fitted, without the need to otherwise change the internal structures of the cylinder and the plunger, it is possible to easily change the hydraulic damper force generated by the chain tensioner. Thus, it is possible to provide chain tensioners which use common parts except their plugs and which are still capable of generating different hydraulic damper forces according to different engine types. Obviously, such chain tensioners can be manufactured at a lower cost.

In one arrangement, the leak groove is defined by an external thread, and has an axial length larger than the axial length of the cylindrical inner periphery of the through hole, and the plug has a first end surface remoter from the pressure chamber than is a second end surface of the plug, and axially spaced apart by a predetermined distance from the protruding end surface of the plunger. With this arrangement, the plug has a portion protruding into the pressure chamber and formed with the external thread. Thus, by moving the plug in the direction in which the above-mentioned predetermined distance decreases, it is possible to increase the portion of the plug press-fitted in the cylindrical inner periphery of the through hole toward the side away from the pressure chamber, without making any structural change to the plug and the plunger, thereby increasing the length of the portion of the external thread that engages the cylindrical inner periphery of the through hole, i.e., increasing the length of the helical air vent passage. By adjusting the length by which the air vent passage is increased, it is possible to adjust the leakage behavior of the air vent passage, and thus the hydraulic damper force.

Preferably, the leak gap has a radial dimension of 30 to 60 micrometers. This range is the lower limit below which the leak gap cannot practically perform its expected function, and is an optimal range within which the hydraulic damper force generating characteristics is least influenced by a change in the leak gap due to a change in temperature. The lesser this influence is, the more strongly the hydraulic damper force generating characteristics tend to be influenced by the leakage behavior of the air vent passage, which is relatively less likely to be influenced by a change in temperature, so that it becomes easier to adjust the hydraulic damper force generating characteristics by adjusting the length of the press-fitted portion of the plug.

The cylinder may be made from an aluminum-based material, and the plunger and the plug may be made from an iron-based material. Ordinarily, the cylinder is made from an aluminum-based material, and the plunger is made from an iron-based material. Thus, by making the plug from an iron-based material, it is possible to minimize the difference in thermal behavior between the plunger and the plug if the plunger is an ordinary plunger, thus minimizing the influence of a change in temperature on the leakage behavior of the air vent passage.

The present invention further provides a chain tensioner group comprising a first chain tensioner including a tubular cylinder having an open end and a closed end, a plunger axially slidably inserted in the cylinder, wherein the plunger is a tubular member having an open end located in the cylinder and a protruding end surface protruding beyond the cylinder, an oil supply passage connected at one end of the oil supply passage to a pressure chamber defined by the cylinder and the plunger such that hydraulic oil can be supplied into the pressure chamber via the oil supply passage, a check valve provided at the one end of the oil supply passage, and configured to allow only a flow of hydraulic oil from the oil supply passage toward the pressure chamber, wherein a leak gap is defined between sliding surfaces of the cylinder and the plunger, and configured such that hydraulic oil in the pressure chamber can flow out of the pressure chamber via the leak gap, a return spring biasing the plunger in a direction in which the plunger protrudes out of the cylinder, wherein the plunger is formed with a through hole extending from the protruding end surface of the plunger to the pressure chamber, and having a cylindrical inner periphery; and a first plug having a first leak groove on an outer periphery of the first plug, and press-fitted in the cylindrical inner periphery of the through hole to define a first air vent passage between the cylindrical inner periphery of the through hole and the first plug.

The chain tensioner group further comprises a second chain tensioner identical in structure to the first chain tensioner except that instead of the first plug, a second plug different in kind from the first plug (i.e., a different type of plug) and having a second leak groove different in kind from the first leak groove is press-fitted in the cylindrical inner periphery of the through hole such that the second chain tensioner generates a hydraulic damper force different from a hydraulic damper force generated by the first chain tensioner.

Still further, the present invention provides a method of manufacturing a second chain tensioner, comprising providing a first chain tensioner including a tubular cylinder having an open end and a closed end, a plunger axially slidably inserted in the cylinder, wherein the plunger is a tubular member having an open end located in the cylinder and a protruding end surface protruding beyond the cylinder, an oil supply passage connected at one end of the oil supply passage to a pressure chamber defined by the cylinder and the plunger such that hydraulic oil can be supplied into the pressure chamber via the oil supply passage, a check valve provided at the one end of the oil supply passage, and configured to allow only a flow of hydraulic oil from the oil supply passage toward the pressure chamber, wherein a leak gap is defined between sliding surfaces of the cylinder and the plunger, and configured such that hydraulic oil in the pressure chamber can flow out of the pressure chamber via the leak gap, a return spring biasing the plunger in a direction in which the plunger protrudes out of the cylinder, wherein the plunger is formed with a through hole extending from the protruding end surface of the plunger to the pressure chamber, and having a cylindrical inner periphery, and a first plug having a first leak groove on an outer periphery of the first plug, and press-fitted in the cylindrical inner periphery of the through hole to define a first air vent passage between the cylindrical inner periphery of the through hole and the first plug.

Instead of the first plug, a second plug different in kind (type) from the first plug and having a second leak groove different in kind (type) from the first leak groove is press-fit into the cylindrical inner periphery of the through hole such that the second chain tensioner generates a hydraulic damper force different from a hydraulic damper force generated by the first chain tensioner.

Advantages of the Invention

According to the invention directed to the chain tensioner, it is possible to easily change the hydraulic damper force simply by changing the plug pressed into the through hole, without the need to otherwise change the internal structures of the cylinder and the plunger. Thus, it is possible to provide a plurality of chain tensioners using common plungers and cylinders and still capable of generating different hydraulic damper forces.

According to the invention directed to the chain tensioner group, it is possible to provide a plurality of kinds of chain tensioners capable of generating different hydraulic damper forces simply by using different kinds (types) of plugs which are formed with different kinds of leak grooves.

According to the invention directed to the method of manufacturing a chain tensioner, simply by replacing a first plug of a first chain tensioner with a second plug different in kind from (of a different type than) the first plug and formed with a leak groove different in kind from (of a different type than) the leak groove of the first plug, it is possible to provide a second chain tensioner which can generate a hydraulic damper force different from the hydraulic damper force generated by the first chain tensioner.

DETAILED DESCRIPTION OF THE INVENTION

Figure 1:
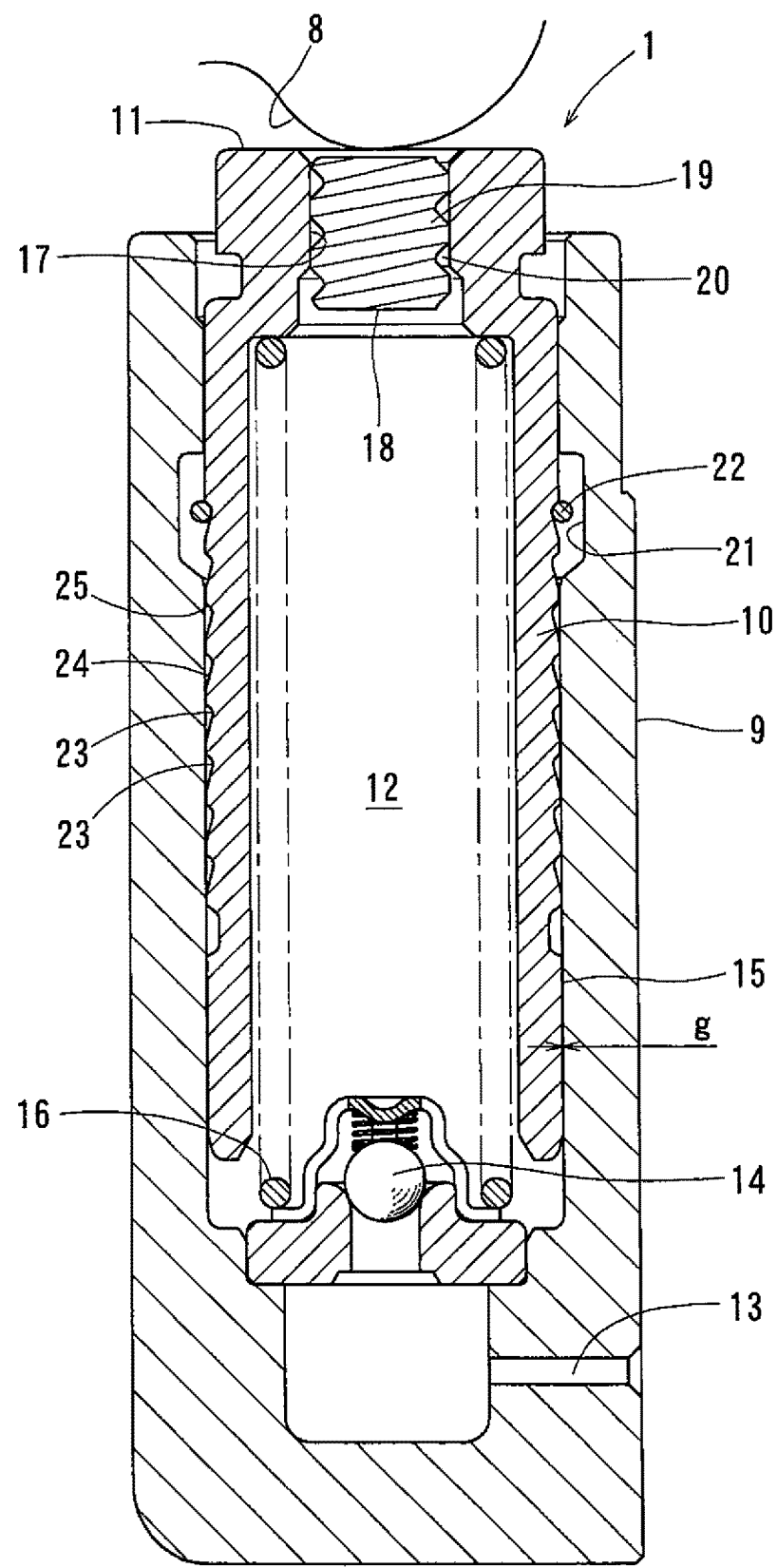
FIG. 1 is a vertical sectional front view of a first chain tensioner embodying the present invention, showing its entirely.
Figure 2:
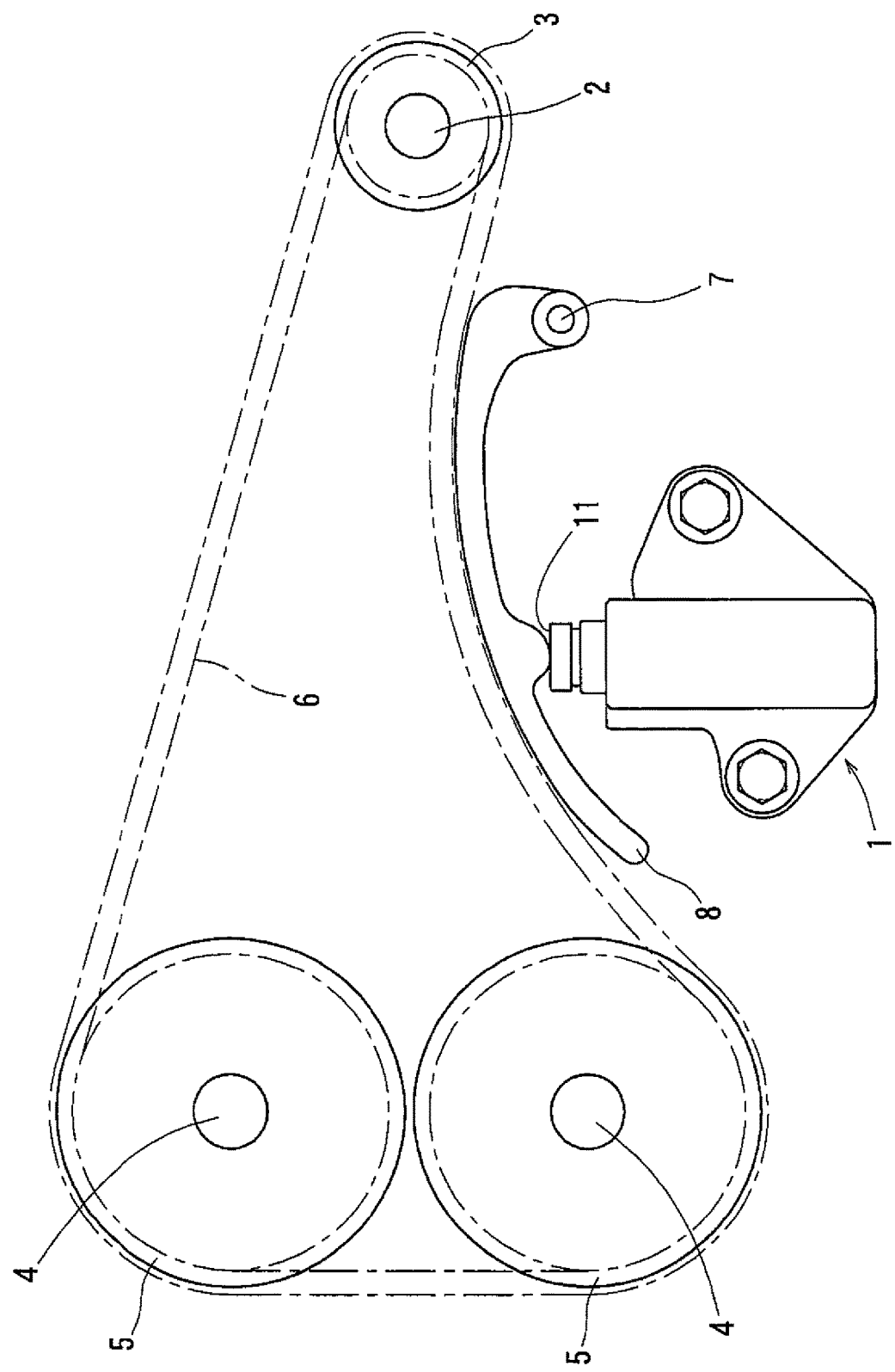
FIG. 2 schematically shows a chain transmission device including the first chain tensioner shown in FIG. 1.

FIG. 1 shows a first chain tensioner 1 embodying the present invention. FIG. 2 shows a chain transmission device including the chain tensioner 1. The chain transmission device includes a sprocket 3 fixed to the crankshaft 2 of an engine, sprockets 5 fixed to respective camshafts 4, and a chain 6. The chain 6 couples the sprocket 3 to the sprockets 5 to transmit the rotation of the crankshaft 2 to the camshafts 4, thereby opening and closing valves (not shown) in the combustion chamber. The chain transmission device further includes a chain guide 8 pivotable about a pivot shaft 7 and in contact with the chain 6. The first chain tensioner 1 presses the chain 6 via the chain guide 8.

As shown in FIG. 1, the first chain tensioner 1 includes a tubular cylinder 9 having an open end and an opposite closed end, and a plunger 10 axially slidably inserted in the cylinder 9. The cylinder 9 is fixed to an engine block (not shown) such that the plunger 10 protrudes obliquely upward. The plunger 10 is a tubular member having an open end located in the cylinder 9 and having a protruding end surface 11 protruding beyond the cylinder 9. The plunger 10 and the cylinder 9 define a pressure chamber 12.

The closed end of the cylinder 9 is formed with an oil supply passage 13 communicating with the pressure chamber 12. The oil supply passage 13 is connected to an oil pump (not shown), and introduces hydraulic oil delivered from the oil pump into the pressure chamber 12. A check valve 14 is provided at the end of the oil supply passage 13 on the side of the pressure chamber 12 to permit only a flow of hydraulic oil from the oil supply passage 13 toward the pressure chamber 12.

A leak gap 15 is defined between the sliding surfaces of the plunger 10 and the cylinder 9 so that hydraulic oil in the pressure chamber 12 leaks through the leak gap 15 into an engine room (not shown).

The cylinder 9 is made from an aluminum-based material. The plunger 10 is made from an iron-based material. Thus, there is a difference in thermal behavior (thermal expansion) between the cylinder 9 and the plunger 10. Further, since the leak gap 15 is very small in radial dimension, the size of the leak gap 15 changes with changes in temperatures of the cylinder 9 and the plunger 10, thus changing the generation behavior of the hydraulic damper force of the chain tensioner 1. In order to minimize changes in the generation behavior, the radial dimension g of the leak gap 15 is set within a range of 30-60 micrometers. The radial dimension g of the leak gap 15 is equal to half the difference in diameter between the (cylindrical) sliding surface of the cylinder 9 and the (cylindrical) sliding surface of the plunger 10. This value g is the value in the dimensional control at the point of manufacture of the cylinder 9 and the plunger 10, and is within the above range over the entire length of the leak gap 15 when the ambient temperature is at the thermal equilibrium state of 20° C.

The plunger 10 is biased by a return spring 16 mounted in the pressure chamber 12 in the direction in which the plunger 10 protrude from the cylinder 9. The return spring 16 has one end thereof supported by the check valve 14, and presses, at the other end thereof, the protruding end portion of the plunger 10 protruding from the cylinder 9. The protruding end surface 11, which is formed on the protruding end portion of the plunger 10, is in abutment with the chain guide 8.

Figure 3:
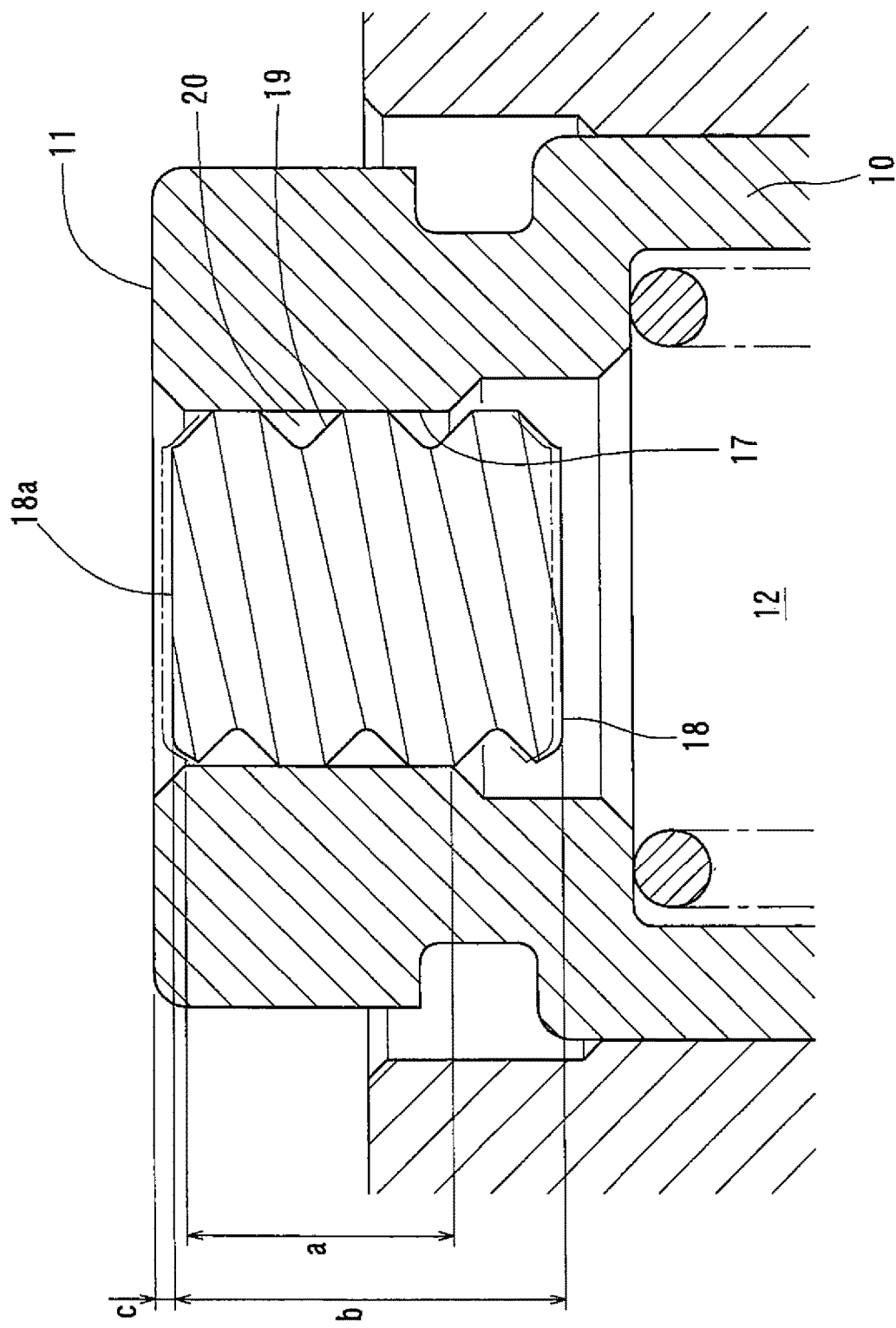
FIG. 3 is an enlarged view of and around a first plug shown in FIG. 1.

As shown in FIGS. 1 and 3, a through hole 17 is formed in the protruding end portion of the plunger 10 to extend from the protruding end surface 11 to the pressure chamber 12. A first plug 18 is press-fitted in the (cylindrical) inner periphery of the through hole 17. The first plug 18 has an outer periphery formed with a first leak groove 19 defined by an external thread. The leak groove 19 is defined by an external thread, so that a first helical air vent passage 20 is defined between the leak groove 19 and the cylindrical inner periphery of the through hole 17.

As shown in FIG. 1, the inner periphery of the cylinder 9 is formed with an annular receiving recess 21 in which is received a register ring 22 so as to be movable in the axial direction. The register ring 22 is a ring member having opposed, separate circumferential ends so as to be radially elastically deformable, and is tightly and elastically wrapped around the outer periphery of the plunger 10 so as to be engageable in any one of a plurality of circumferential grooves 23 formed in the outer periphery of the plunger 10 so as to be spaced apart from each other at regular intervals in the axial direction.

Each circumferential groove 23 includes a tapered surface 24 shaped and arranged such that when the plunger 10 is subjected to a load that tends to push out the plunger 10, the register ring 22 can slide along the tapered surface 24 while being radially expanded, thereby allowing the movement of the plunger 10. Each circumferential groove 23 further includes a stopper surface 25 shaped and arranged such that when the plunger 10 is subjected to a load that tends to push in the plunger 10, the register ring 22 engages the stopper surface 25, thereby restricting the movement of the plunger 10 (i.e., each stopper surface 25 is located at a side of the respective circumferential groove 23 closest to the protruding end surface of the plunger 10 with respect to a longitudinal axis of the plunger). Thus, when trapped between the stopper surface 25 of any circumferential groove 23 and a tapered surface of the receiving recess 21, the register ring 22 prevents the plunger 10 from being pushed into the cylinder 9. In other words, the register ring 22, the circumferential grooves 23, and the receiving recess 21 constitute a stopper mechanism.

The operation of the first chain tensioner 1 is now described.

When, as shown in FIG. 2, the tension of the chain 6 increases while the engine is running, the tension of the chain 6 pushes in the plunger 10, shown in FIG. 1, so that the tension of the chain 6, shown in FIG. 2, decreases. When the plunger 10 is pushed in, the plunger 10 moves slowly under a damper force generated by the viscous resistance of hydraulic oil flowing out of the pressure chamber 12 and through the leak gap 15, shown in FIG. 1.

When the tension of the chain 6, shown in FIG. 2, decreases while the engine is running, the plunger 10 is pushed out under the biasing force of the return spring 16, shown in FIG. 1, thus removing slackness of the chain 6, shown in FIG. 2. When the plunger 10 is pushed out, the check valve 14, shown in FIG. 1, opens, and hydraulic oil flows from the oil supply passage 13 into the pressure chamber 12, so that the plunger 10 moves rapidly.

Due to vibration of the chain 6, the plunger 10, shown in FIG. 1, repeatedly advances and retracts, so that the register ring 22 also repeatedly moves back and forth in the receiving recess 21. When the chain 6, shown in FIG. 1, slackens, and the plunger 10, shown in FIG. 1, is pushed out until the register ring 22 becomes unmovable relative to the receiving recess 21, the register ring 22 now slides along the tapered surface 24 of one of the circumferential grooves 23 while being radially expanded, thereby allowing the plunger 10 to be further pushed out, and the register ring 22 to be engaged in the next circumferential groove 23.

When the engine is stopped, according to the positions of the camshafts 4, shown in FIG. 2, the tension of the chain 6 may be kept high. In such a case, the register ring 22, shown in FIG. 1, remains engaged in one of the circumferential grooves 23, so that the plunger 10 will never be pushed in any further. Thus, when the engine is restarted, the chain 6, shown in FIG. 1, is less likely to become slack, so that the engine can be started smoothly.

When the engine is stopped, since the oil pump also stops, the level of hydraulic oil in the oil supply passage 13, shown in FIG. 1, drops, so that a large amount of air is introduced into and remains in the oil supply passage 13. Thus, when the engine is restarted, a large amount of air is mixed into hydraulic oil fed into the pressure chamber 12 through the oil supply passage 13. However, any air introduced into the pressure chamber 12, which could lower the damper effect, is expelled through the air vent passage 20 to the outside, so that the damper effect remains high.

While the engine temperature is low, since hydraulic oil supplied is high in viscosity, the oil supply pressure tends to be high. As a result, the damper force (dynamic reaction force) generated may become excessive. Therefore, preferably, the diameter of the outlet of the oil supply passage 13 is set to such a small value that due to a pressure loss, the pressure in the pressure chamber 12 will not rise excessively even while the engine temperature is low, and thus the oil supply pressure is high. In particular, while the oil supply passage of a conventional chain tensioner typically has an outlet diameter of 2 to 3 mm, it is possible to prevent an excessive pressure rise in the pressure chamber 12 by setting the outlet diameter of the oil supply passage 13 to e.g., 1.5 mm or less.

The letter a in FIG. 3 indicates the axial length of the cylindrical inner periphery of the through hole 17, while the letter b in FIG. 3 indicates the axial length of the leak groove 19. As used herein, the term "axial" or "axial direction" refers to the direction in which extends the center axis of the cylindrical inner periphery of the through hole 17, which coincides with the center axis of the first leak groove 19. The cylindrical inner periphery of the through hole 17 is a radially inner surface of the through hole 17 which is axially continuous and has a constant diameter. Thus, the axial length a is the axial length of this radially inner surface. The axial length b is the axial length of the portion of the outer periphery of the first plug 18 (which can be press-fitted into the cylindrical inner periphery of the through hole 17) where the thread defining the first leak groove 19 is formed. In the example shown, the thread defining the first leak groove 19 extends substantially the entire axial length of the first plug 18, so that the axial length b is substantially equal to the entire axial length of the first plug 18.

The axial length b (of the first leak groove 19) is larger than the axial length a (of the cylindrical inner periphery of the through hole 17). The first plug 18 is press-fitted into the cylindrical inner periphery of the through hole 17 such that the first end surface 18a of the first plug 18 that is more remote (farther) from the pressure chamber 12 than is the second end surface of the first plug 18 is axially spaced, by a distance c, from the protruding end surface 11 of the plunger 10. The distance c is the shortest axial distance between the end surface 18a and the portion of the protruding end surface 11 that can contact the chain guide 8. The distance c prevents the situation in which the end surface 8a of the plug 18, which is remote from the pressure chamber 12, is pushed by the chain guide 8 when the chain guide 8 is in contact with the protruding end surface 11, thereby shortening the air vent passage 20, and changing the hydraulic damper force generating characteristics compared with the hydraulic damper force generating characteristics while the air vent passage 20 is not shortened. As long as there is the distance c, the end surface 18a of the first plug 18 can be further moved away from the pressure chamber 12 without the fear of the above-mentioned situation.

Since the first chain tensioner 1 is configured such that the axial length b of the first leak groove 19 is larger than the axial length a of the cylindrical inner periphery of the through hole 17, and the first plug 18 is press-fitted in the cylindrical inner periphery of the through hole 17 with the thread that defines the first leak groove 19 in close contact with the cylindrical inner periphery such that the distance c remains, the plug 18 partially protrudes, while being press-fitted in the through hole 17, into the pressure chamber 12, and the portion of the thread defining the first leak groove 19 is present on this protruding portion.

Through the air vent passage 20, whose length in the spiral direction is determined by the portion of the first plug 18 press-fitted in the through hole 17, not only is air vented as described above, but hydraulic oil also leaks. The leakage of hydraulic oil through the air vent passage 20 influences the behavior of the chain tensioner when the plunger is pushed in, and hydraulic oil in the pressure chamber leaks out, and thus influences the hydraulic damper force generating characteristics of the chain tensioner. Thus, it is possible to provide a second chain tensioner which is a different type than the first chain tensioner 1 in that it can generate a hydraulic damper force that is different from the hydraulic damper force generated by the first chain tensioner 1, simply by replacing the first plug 18 of the first chain tensioner 1 with a second plug 18' that is a different type than the first plug 18 to define a second air vent passage that is different from the first air vent passage 20. Thus, a chain tensioner group, or chain tensioner kit, comprises a chain tensioner as described above including a first type of plug defining a first type of air vent passage, and including a second type of plug defining a second type of air vent passage.

Figure 4A:
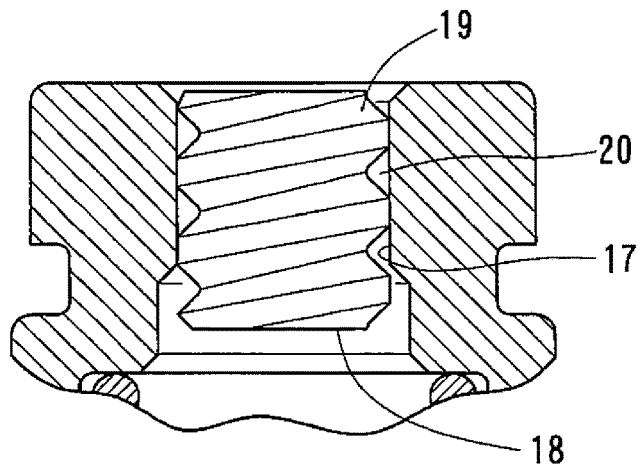
FIG. 4A is an enlarged view of and around the first plug shown in FIG. 1.
Figure 4B:
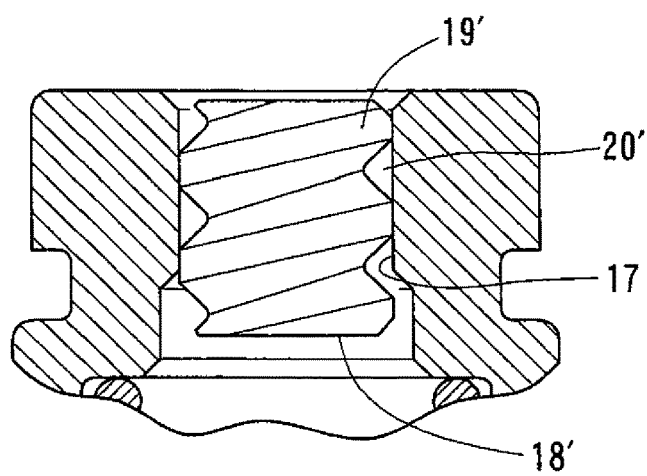
FIG. 4B shows, on the same scale as FIG. 4A, a modification in which the first plug is replaced with a second plug which is different in kind from the first plug.
Figure 4C:
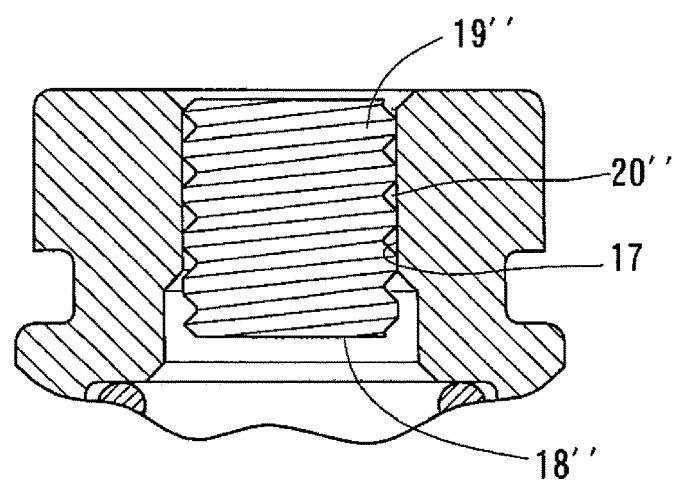
FIG. 4C shows, on the same scale as FIGS. 4A and 4B, a modification in which the first plug is replaced with a third plug which is different in kind from the first plug.

FIGS. 4A to 4C show, on the same scale, the first plug 18 of the first chain tensioner 1, the second plug 18' of the second chain tensioner, and a third plug 18" of a third chain tensioner which is different in kind from the first and second plugs 18 and 18', respectively, when they are press-fitted in the through hole 17. The second plug 18' defines a second leak groove 19' that is different from the first leak groove 19. The third plug 18" defines a third leak groove 19" that is different both from the first and second leak grooves 19 and 19'. The second chain tensioner, of which the second plug 18' and its surroundings are shown in FIG. 4B, is different in kind from the first chain tensioner 1, shown in FIG. 1, in that the first plug 18 is replaced with the second plug 18', but is otherwise identical in internal structure to the first chain tensioner 1. The third chain tensioner, of which the third plug 18' and its surroundings are shown in FIG. 4C, is different in kind from the first chain tensioner 1 in that the first plug 18 is replaced with the third plug 18", but is otherwise identical in internal structure to the first chain tensioner 1. In other words, the different types of plugs 18, 18', and 18" in combination with the other components of the chain tensioner 1 form a chain tensioner group, or chain tensioner kit, which has different characteristics depending on which one of the plugs 18, 18', and 18" is press-fit in the through hole 17 due to the respective different air vent passages 20, 20', and 20" created thereby.

As will be apparent from FIGS. 4A to 4C, the second plug 18' and the third plug 18" are identical to the first plug 18 in that they are press-fitted in the through hole 17 with the same interference fit as the first plug 18, and are different from the first plug 18 only in that each of the second leak groove 19' and the third leak groove 19" is defined by an external thread that is different in pitch and lead from the external thread defining the first leak groove 19. Thus, the orifice defined between the cylindrical inner periphery of the (common) through hole 17 and each of the second and third plugs 18' and 18" is different in sectional area and length (in the spiral direction) from the orifice defined in the first chain tensioner 1, so that the second and third chain tensioners provide hydraulic damper force generating characteristics that are different from those of the first chain tensioner 1. In other words, the chain tensioner 1 will provide different hydraulic damper force generating characteristics depending on which one of the plugs 18, 18', and 18" is inserted in the through hole 17 of the plunger 11.

Four different chain tensioners (Test Examples 1-4) were manufactured, of which only the plugs are different in kind. The dynamic reaction forces of Test Examples 1-4 were measured to investigate how the hydraulic damper force changes only by replacing the plug with another kind of plug. The dynamic reactions were measured under the following conditions:
(1) Vibration amplitude: ±0.2 mm
(2) Vibration frequency: 50 Hz
(3) Oil supply pressure: 0.3 MPa
(4) Temperature: Room Temperature Test Example 1 has an orifice sectional area of 0.13 mm$^2$, and an orifice length of 45 mm. The dynamic reaction force of Test Example 1 was 2400 N.

Test Example 2 has an orifice sectional area of 0.2 mm$^2$, and an orifice length of 33 mm. The dynamic reaction force of Test Example 2 was 1600 N.

Test Example 3 has an orifice sectional area of 0.37 mm$^2$, and an orifice length of 30 mm. The dynamic reaction force of Test Example 3 was 780 N.

Test Example 4 has an orifice sectional area of 0.6 mm$^2$, and an orifice length of 21 mm. The dynamic reaction force of Test Example 4 was 300 N.

The test results clearly show that, as is apparent from the fact that the dynamic reaction forces of Test Examples 1-4 are different from each other, simply by replacing the plug with different plugs having different leak grooves, it is possible to manufacture chain tensioners which are different in hydraulic damper force generating characteristics from each other.

In particular, as is apparent from the test results for Test Examples 1-4, it is possible to change the hydraulic damper force by several times simply by changing the shape of the leak groove while not changing its outer diameter. By changing the damper force by several times, the chain tensioner can cope with different engine properties of engines of different types and models. For example, if the first chain tensioner 1, shown in FIG. 1, is manufactured for an engine of a first type, then this chain tensioner can be transformed into chain tensioners which generate hydraulic damper forces different from the hydraulic damper force generated by the first chain tensioner, and which can thus be used for engines of second and third types, simply by replacing the first plug 18 with e.g., the second plug 18' shown in FIG. 4B and the third plug 18" shown in FIG. 4C, respectively. The hydraulic damper forces of these different chain tensioners are controlled under mutually different quality control standards. For example, the maximum set value of the hydraulic damper force is different from one chain tensioner to another.

In order to prevent the leak properties of the air vent passages 20, 20' and 20" from changing with a change in temperature, the plugs 18, 18' and 18", shown in FIGS. 4A-4C, are, as with the plunger 10 shown in FIG. 1, preferably made from an iron-based material.

When the plugs 18, 18' and 18" are made from an iron-based material, the leak grooves 19, 19' and 19" can be formed e.g., by rolling. By forming the leak grooves by rolling, the structure of the outer periphery of the plugs 18, 18' and 18" is not cut, so that burrs are less likely to develop on the outer periphery of the plugs, so that burrs are less likely to enter the air vent passages 20, 20' and 20", which in turn stabilizes the performance of leakage of oil from the pressure chamber 12, shown in FIG. 1. Alternatively, the leak grooves 19, 19' and 19" may be formed by heading. Further alternatively, the plugs 18, 18' and 18" may be formed by injection-molding a resin so that the leak grooves 19, 19' and 19" are simultaneously formed by injection molding. As in the case where the leak grooves 19, 19' and 19" are formed by rolling or heading, burrs are similarly less likely to form on the plugs formed by injection-molding, so that burrs are less likely to enter the air vent passages 20, 20' and 20". If the plugs 18, 18' and 18" by injection molding, a phenolic resin is preferably used because when the ambient temperature is high, the difference in thermal expansion is small between the plunger 10, shown in FIG. 1, and the plugs 18, 18' and 18" made from a phenolic resin, so that the sectional area of the air vent passages 20, 20' and 20", shown in FIGS. 4A-4C, is less likely to change, which stabilizes the oil leakage performance.

According to the shape and the material of the external thread defining the leak groove 19, 19', 19" of each plug 18, 18', 18", the plug 18, 18', 18" can be configured such that the portion of the external thread at the protruding end of the plug 18, 18', 18" is slightly pushed into the cylindrical inner periphery of the through hole 17 due to elastic deformation when the pressure in the pressure chamber 12, shown in FIG. 1, rises, and springs back when the pressure in the pressure chamber 12 falls thereafter. This arrangement increases the resistance to the force that tends to cause the plug 18, 18', 18", shown in FIGS. 4A-4C, to be pulled out in the direction in which pressure is applied to the plug from the pressure chamber 12.

While the plugs shown are each formed with a single leak groove 19, 19', 19" defined by a single trapezoidal external thread, each plug may be formed with multiple leak grooves defined by multiple trapezoidal external threads. With this arrangement, since multiple air vent passages are formed, even if one of these air vent passages becomes clogged, air in the pressure chamber 12, shown in FIG. 1, can be reliably vented through the other air vent passage or passages.

Each of the above-mentioned first to third chain tensioner can be transformed into a chain tensioner which can generate a different hydraulic damper force, not by changing the structures of the plunger 10 and the plug 18, 18', 18", shown in FIGS. 4A-4C, but by moving the plug 18, 18', 18" in the direction away from the pressure chamber 12 within the range in which the distance c, shown in FIG. 3, still remains, thereby increasing the portion of the plug 18, 18', 18" that is press-fitted in the cylindrical inner periphery of the through hole 17 toward the side away from the pressure chamber, thereby increasing the length of the portion of the leak groove 19, 19', 19" that engages the cylindrical inner periphery of the through hole 17 in the spiral direction (i.e., increasing the length of the air vent passage (orifice) 20, 20', 20" in the spiral direction), without actually increasing the length of the plug 18, 18', 18". Thus, simply by changing the press-fitted portion of the plug 18, 18', 18", it is possible to provide a different kind of chain tensioner that can generate a different hydraulic damper force.

In this regard, the first plug 18 of the first chain tensioner, shown in FIG. 1, is shown by solid line in FIG. 3, while the one-dot chain line in FIG. 3 shows an alternate plug arrangement of an alternate chain tensioner. As shown, this alternate chain tensioner differs from the first chain tensioner only in that the plug is moved in the direction away from the pressure chamber 12 compared with the first arrangement of plug 18, and the internal components of the chain tensioner (including the cylinder 9, plunger 10, and plug 18) are all identical in structure to those of the first chain tensioner. Since the plug is moved away from the pressure chamber 12 compared with the plug 18 of the first arrangement, the portion of the plug that is press-fitted in the cylindrical inner periphery of the through hole 17 of the alternate chain tensioner is larger (by the distance between the one-dot chain line and the solid line in FIG. 3) than the corresponding portion of the first chain tensioner, so that the alternate chain tensioner generates a hydraulic damper force different from the hydraulic damper force generated by the first chain tensioner.

Preferably, the axial length b of the leak groove 19, the axial length a of the cylindrical inner periphery of the through hole 17, and the distance c are determined to satisfy the relation: (b·a)>c. With this arrangement, it is possible to increase the length of the air vent passage in the spiral direction by moving the plug in the direction away from the pressure chamber until the distance c becomes nearly zero, thus maximizing the range within which the hydraulic damper force generating characteristics are adjustable.

The chain tensioners shown in FIGS. 1, 4B and 4C are different from each other only in the types of the plugs 18, 18' and 18", which are press-fitted in the cylindrical inner peripheries of the respective through holes 17, and otherwise identical in internal structure to each other such that the respective chain tensioners can generate different hydraulic damper forces.

Since the first chain tensioner 1, shown in FIG. 1, and the second and third chain tensioners, which are shown in FIG. 4B, 4C, and which generate different hydraulic damper forces, differ from each other only in that the first plug 18, shown in FIGS. 1 and 4A, differs from the second and third plugs 18' and 18" in that, as shown in FIGS. 4B, 4C, the leak grooves 19' and 19" differ in form from the leak groove 19, these chain tensioners can be manufactured easily.

Thus, the first chain tensioner, shown in FIGS. 1 and 4A, can be easily transformed into the second or third chain tensioner, which is shown in FIG. 4B, 4C, and which generates a different hydraulic damper force, simply by press-fitting, instead of the first plug 18, shown in FIGS. 1 and 4A, the second or third plug 18', 18", which is different from the first plug 18 only in that, as shown in FIGS. 4B, 4C, the leak groove 19', 19" differs in form from the leak groove 19, into the cylindrical inner periphery of the through hole 17.

Each of the first to third chain tensioners, shown, respectively, in FIGS. 1, 4B and 4C, includes, as will be understood from FIG. 1, a register ring 22 received in an annular receiving recess 21 formed in the inner periphery of the cylinder 9, and tightly and elastically wrapped around the outer periphery of the plunger 10 so as to be engageable in any one of circumferential grooves 23 formed in the outer periphery of the plunger 10 so as to be axially spaced apart from each other at regular intervals. Each circumferential groove 23 includes a tapered surface 24 shaped and arranged such that when the plunger 10 is subjected to a load that tends to push the plunger 10 out of the cylinder 9, the register ring 22 can slide along the tapered surface 24 while being radially expanded, thereby allowing the movement of the plunger 10. Each circumferential groove 23 further includes a stopper surface 25 shaped and arranged such that when the plunger 10 is subjected to a load that tends to push the plunger 10 into the cylinder 9, the register ring 22 engages the stopper surface 22, thereby restricting the movement of the plunger 10. However, the present invention is applicable to a chain tensioner of a different structure.

For example, the present invention is applicable to a chain tensioner of the type, as disclosed in JP Patent Publication 2009-79604A, including a plunger having an tubular end inserted in the cylinder and formed with an internal threaded on the inner periphery of the tubular end, and a screw rod having, on the outer periphery thereof, an external thread in engagement with the internal thread of the plunger, and supporting the return spring. In this type of chain tensioner, the external thread of the screw rod and the internal thread of the plunger preferably have an asymmetrical axial sectional shape, i.e., have a serration-shaped axial section such that pressure flank thereof, i.e., the surface on which pressure acts when the plunger receives a force that tends to push the plunger into the cylinder, has a larger flank angle than the clearance flank thereof. The present invention is not limited to the above-described embodiments, and covers every possible modification thereof within the scope defined by the accompanying claims.

DESCRIPTION OF THE REFERENCE NUMERALS

1. First chain tensioner
9. Cylinder
10. Plunger
11. Protruding end surface
12. Pressure chamber
13. Oil supply passage
14. Check valve
15. Leak gap
16. Return spring
17. Through hole
18, 18', 18". Plug
19, 19', 19". Leak groove
20, 20', 20". Air vent passage

What is claimed is:

1. A chain tensioner kit comprising:
   a tubular cylinder having an open end and a closed end;
   a plunger axially slidably inserted in the cylinder, the plunger being a tubular member having an open end located within the cylinder and a protruding end surface protruding outside of the cylinder;
   an oil supply passage having an end communicating with a pressure chamber defined by an interior of the cylinder and an interior of the plunger, the oil supply passage being configured to supply hydraulic oil into the pressure chamber, the plunger having a through hole extending from the protruding end surface to the pressure chamber;
   a check valve provided at the end of the oil supply passage, the check valve being configured to allow a flow of hydraulic oil in a direction only from the oil supply passage toward the pressure chamber;
   a return spring biasing the plunger in a direction in which the plunger protrudes out of the cylinder;
   a first plug having a first leak groove on an outer periphery thereof; and
   a second plug having a second leak groove on an outer periphery thereof, the first leak groove having a different shape than the second leak groove;
   wherein the cylinder and the plunger are configured to define a leak gap between sliding surfaces of the cylinder and the plunger, the cylinder and the plunger being configured such that hydraulic oil in the pressure chamber can flow out of the pressure chamber via the leak gap; and
   wherein one of the first plug and the second plug is press-fitted into a cylindrical inner periphery of the through hole to define an air vent passage between the cylindrical inner periphery of the through hole and the outer periphery of the one of the first plug and the second plug, wherein a hydraulic damper force of the chain tensioner is adjusted depending on the one of the first plug and the second plug press-fit into the through hole.

2. The chain tensioner kit of claim 1, wherein the leak groove is defined by an external thread, the leak groove having an axial length larger than an axial length of the cylindrical inner periphery of the through hole, and the one of the first plug and the second plug having a first end surface and a second end surface opposite the first end surface and located closer to the pressure chamber than is the first end surface, the first end surface being axially spaced apart from the protruding end surface of the plunger by a predetermined distance.

3. The chain tensioner kit of claim 2, wherein the leak gap has a radial dimension of 30 micrometers to 60 micrometers.

4. The chain tensioner kit of claim 3, wherein the cylinder is made from an aluminum-based material, and the plunger, the first plug and the second plug are made from an iron-based material.

5. The chain tensioner kit of claim 2, wherein the cylinder is made from an aluminum-based material, and the plunger, the first plug, and the second plug are made from an iron-based material.

6. The chain tensioner kit of claim 1, wherein the leak gap has a radial dimension of 30 micrometers to 60 micrometers.

7. The chain tensioner kit of claim 6, wherein the cylinder is made from an aluminum-based material, and the plunger, the first plug and the second plug are made from an iron-based material.

8. The chain tensioner kit of claim 1, wherein the cylinder is made from an aluminum-based material, and the plunger, the first plug, and the second plug are made from an iron-based material.

9. The chain tensioner kit of claim 1, further comprising a stopper mechanism for preventing the plunger from being pushed into the cylinder beyond a set point, the stopper mechanism including a plurality of circumferential grooves formed in an outer periphery of the plunger so as to be evenly spaced apart along a longitudinal axis of the plunger, an annular receiving recess formed in an inner periphery of the cylinder, and a register ring accommodated within the annular receiving recess.

10. The chain tensioner kit of claim 9, wherein each of the circumferential grooves has a stopper surface located at a side of the respective circumferential groove closest to the protruding end surface of the plunger.

11. A chain tensioner comprising:
    a tubular cylinder having an open end and a closed end;
    a plunger axially slidably inserted in the cylinder, the plunger being a tubular member having an open end located within the cylinder and a protruding end surface protruding outside of the cylinder;
    an oil supply passage having an end communicating with a pressure chamber defined by an interior of the cylinder and an interior of the plunger, the oil supply passage being configured to supply hydraulic oil into the pressure chamber, the plunger having a through hole extending from the protruding end surface to the pressure chamber;
    a check valve provided at the end of the oil supply passage, the check valve being configured to allow a flow of hydraulic oil in a direction only from the oil supply passage toward the pressure chamber;
    a return spring biasing the plunger in a direction in which the plunger protrudes out of the cylinder; and
    a plug having a leak groove on an outer periphery thereof, the plug being press-fitted into a cylindrical inner periphery of the through hole to define an air vent passage between the cylindrical inner periphery of the through hole and the outer periphery of the plug;
    wherein the cylinder and the plunger are configured to define a leak gap between sliding surfaces of the cylinder and the plunger, the cylinder and the plunger being configured such that hydraulic oil in the pressure chamber can flow out of the pressure chamber via the leak gap; and wherein the leak groove of the plug is defined by an external thread, the leak groove having an axial length larger than an axial length of the cylindrical inner periphery of the through hole, and the plug having a first end surface and a second end surface opposite the first end surface and located closer to the pressure chamber than is the first end surface, the first end surface being axially spaced apart from the protruding end surface of the plunger by a predetermined distance.

12. The chain tensioner of claim 11, wherein the leak gap has a radial dimension of 30 micrometers to 60 micrometers.

13. The chain tensioner of claim 11, wherein the cylinder is made from an aluminum-based material, and the plunger and the plug are made from an iron-based material.

14. The chain tensioner of claim 11, wherein the leak groove of the plug has a pitch larger than the predetermined distance.

\* \* \* \* \*